March 28, 1961     J. E. GOLDRING     2,976,845
PNEUMATIC-HYDRAULIC DRIVE CYLINDER
Filed Dec. 18, 1959     3 Sheets-Sheet 1
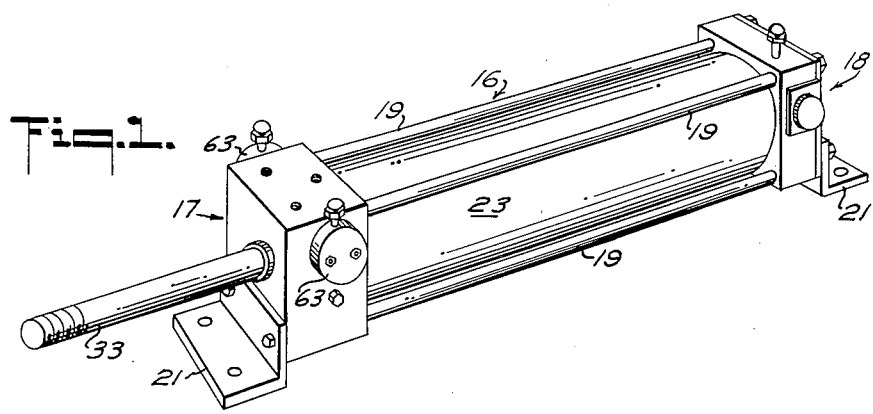
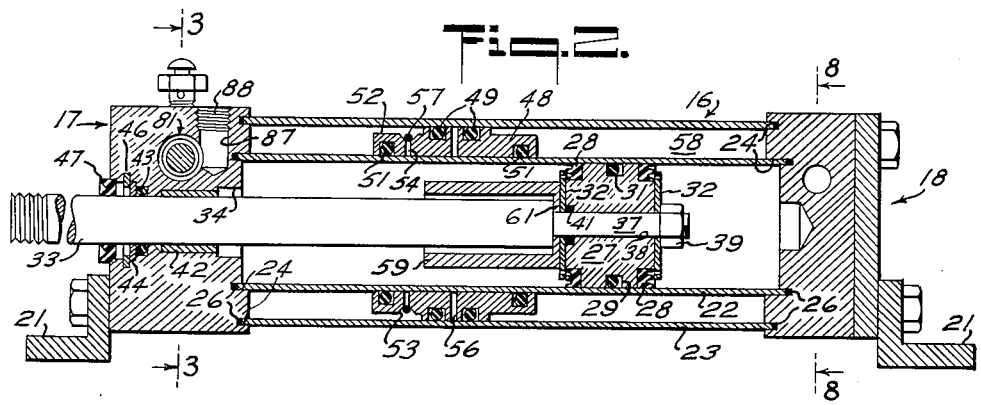
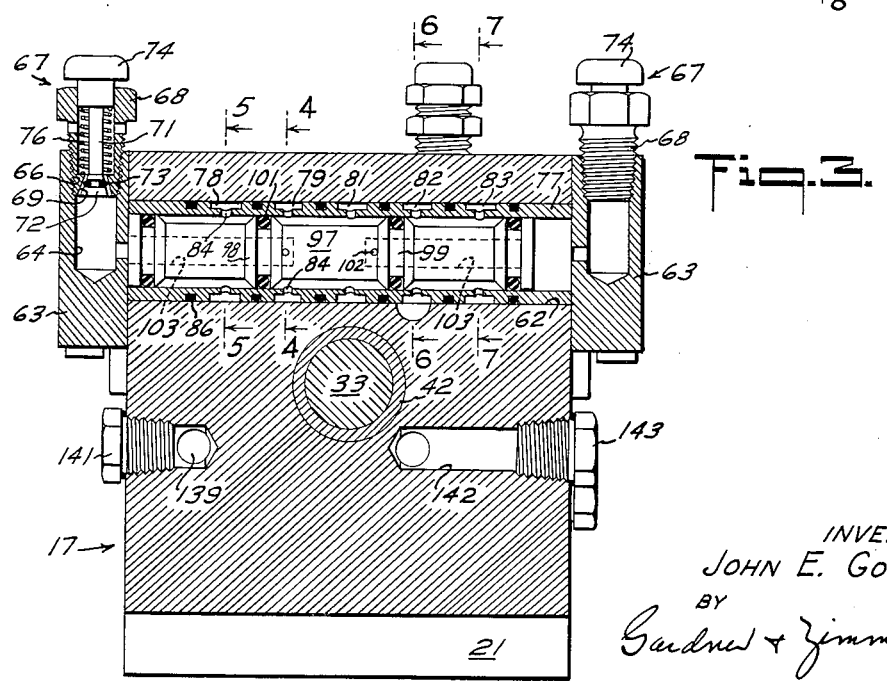
INVENTOR
JOHN E. GOLDRING
BY
Gardner & Zimmerman
ATTORNEYS March 28, 1961 J. E. GOLDRING 2,976,845
PNEUMATIC-HYDRAULIC DRIVE CYLINDER
Filed Dec. 18, 1959 3 Sheets-Sheet 2

INVENTOR
JOHN E. GOLDRING
BY
Gardner & Zimmerman
ATTORNEYS

March 28, 1961  J. E. GOLDRING  2,976,845
PNEUMATIC-HYDRAULIC DRIVE CYLINDER
Filed Dec. 18, 1959  3 Sheets-Sheet 3

INVENTOR
JOHN E. GOLDRING
BY
Gardner & Zimmerman
ATTORNEYS

United States Patent Office 2,976,845
Patented Mar. 28, 1961

2,976,845
PNEUMATIC-HYDRAULIC DRIVE CYLINDER
John E. Goldring, San Leandro, Calif., assignor to Modernair Corporation, San Leandro, Calif., a corporation of California
Filed Dec. 18, 1959, Ser. No. 860,397
9 Claims. (Cl. 121—38)

The present invention relates to fluid powered drive cylinders and more particularly to an air driven cylinder having a self-contained hydraulic mechanism for regulating the motion thereof.

Fluid driven cylinders are widely used to operate mechanisms in which a reciprocating motion is required, the cylinders being generally comprised of a tubular barrel, a piston and drive shaft which are slidable along the axis of the barrel, and means for admitting high pressure fluid to a selected end of the barrel to drive the piston and shaft in a chosen direction. Two principal classes of drive cylinders are manufactured, one class being those operable by hydraulic fluid and the other being those operated by compressed air. Each of the two classes of cylinders have certain advantageous and disadvantageous properties with respect to each other.

Air driven cylinders are somewhat more economical to install and operate in comparison with hydraulic units. As heretofore designed however, simple pneumatic cylinders have been subject to an undesirable variation in stroke velocity whenever the load against which the cylinder is driving undergoes a change. This effect arises from the resiliency of the compressed air behind the piston in the cylinder. If, for example, the load on the cylinder is decreased in the course of a power stroke, the piston and drive shaft will spurt forward at an abnormally great rate. In the converse situation where the load is suddenly increased the drive shaft will lag behind its normal rate of travel while the air in the cylinder builds up to a correspondingly higher pressure. In either circumstance, an oscillation about the average rate of travel may occur temporarily.

The foregoing variation in stroke velocity can be a serious disadvantage in some applications of drive cylinders and in some instances may be a safety hazard. If, for example, the cylinder is to be used to drive a machine tool, the occurrence of a sudden increase in motion of a cutting tool, such as might be caused by cutting through the work, can damage the work or injure an operator. Accordingly the provision of means for holding the stroke travel rate of an air driven cylinder to a selected velocity can extend the usefulness of such cylinders considerably. In addition such means can increase safety in the use of pneumatic cylinders and will permit their use in precision mechanisms.

A hydraulically driven cylinder is not subject to the above problem inasmuch the liquid used therein is substantially incompressible. The hydraulic fluid within such a cylinder contains no stored energy capable of driving the piston forwardly independently of the supply and the fluid cannot absorb energy while allowing the piston to lag its normal rate of travel. Accordingly an air-driven cylinder may be stabilized by causing it to drive a small auxiliary hydraulic cylinder in addition to driving the primary load. In this system the auxiliary cylinder comprises a tubular barrel, a piston sliding therein, and means of controlling the rate of flow of hydraulic fluid between ends of the barrel. When this auxiliary cylinder is coupled to an air-driven cylinder the latter can travel only at a rate determined by the rate at which fluid can pass from one end of the auxiliary cylinder to the other. An auxiliary motion checking cylinder of this class is disclosed in the co-pending application of the present invention, Serial No. 842,789, entitled "Motion Checking Cylinder," and filed September 28, 1959.

The motion checking cylinder of the above specified co-pending application is a separate mechanism from the primary air-driven cylinder which it regulates. The present invention provides a differing mechanism in which a hydraulic motion checking means is self-contained within the primary air-driven cylinder itself. The invention thus provides for minimum installation costs and minimum bulk for the installed system. The invention incorporates the advantages of a hydraulic cylinder into a pneumatic cylinder without unduly increasing the cost thereof.

The invention makes use of a pair of coaxially arranged tubular barrels, the innermost of which contains a piston and a drive shaft which shaft extends through a seal at the forward end of the cylinder and which may be coupled to the load to be driven. A second piston, of annular shape, is slidably disposed between the inner and outer barrels and a quantity of hydraulic fluid fills the rearward end of both barrels behind the respective pistons therein. Connection between the rearward ends of the two barrels is made through an adjustable flow control valve so that the exchange of hydraulic fluid between the two barrels may be held at a constant selected flow rate. A control valve is provided for selectively admitting compressed air to the forward end of each barrel while simultaneously venting the other barrel. While such control valve may be separate from the cylinder proper, it may advantageously be an integral self-contained valve built into the forward end of the cylinder as disclosed in the co-pending application of the present inventor, Serial No. 841,133, entitled "Valve-in-Head Pneumatic Cylinder," and filed September 21, 1959.

In the above apparatus, if air is admitted to the forward end of the outer barrel, the piston therein will be forced rearwardly at a rate determined by the setting of the flow control valve between the two barrels. The forcing of hydraulic fluid into the rearward end of the inner barrel will drive the piston therein forwardly and will thus extend the drive shaft from the cylinder. The motion of the drive shaft may be seen to be fixed by the setting of the flow control valve and inasmuch as it is an incompressible fluid which is bearing against the piston and drive shaft the deleterious variation in rate of travel cannot occur.

Retraction of the drive shaft into the cylinder is accomplished by switching the compressed air supply to the forward end of the inner barrel and simultaneously venting the forward end of the outer barrel. The action is analogous to that described above in that the rate of retraction of the drive shaft is governed by the setting of the flow control valve, i.e. by the rate at which the hydraulic fluid can return to the rearward end of the outer barrel.

It is therefore an object of this invention to provide an integral self-contained means with which the power stroke of a pneumatic drive cylinder can be held at a constant pre-selected value.

It is an object of the present invention to provide an internal hydarulic motion checking mechanism within an air-driven drive cylinder.

It is another object of the invention to provide a compact economically installed pneumatic drive cylinder which is free from unwanted variations in stroke velocity.

It is a further object of this invention to provide a pneumatic cylinder in which variations in the load being driven thereby do not affect the rate of travel thereof with respect to both the extension and retraction strokes.

It is still a further object of this invention to provide a compressed air driven cylinder having self-contained means with which any desired stroke velocity may be selected, such means acting to prevent any deviation from said selected velocity.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 1 is a perspective view of a pneumatic drive cylinder embodying the invention.

Figure 2 is a longitudinal section view of the cylinder showing portions of the internal structure thereof.

Figure 3 is a cross-section view taken along line 3—3 of Figure 2 and showing details of the front head of the cylinder.

Figure 4:
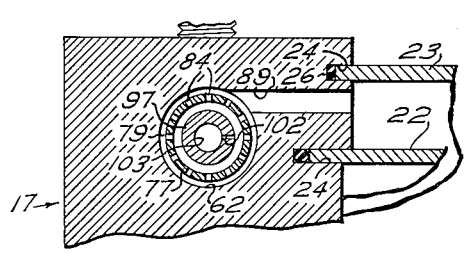
Figure 4 is a section view taken along line 4—4 of Figure 3.

Referring now to the drawings and more particularly to Figure 1 thereof the salient features of the cylinder are a cylindrical barrel assembly 16, a rectangular front head assembly 17 disposed against the forward end of the barrel assembly and centered thereon, and a rear head assembly 18 similarly positioned against the rearmost end of the barrel assembly. The foregoing elements are secured together by four long bolts 19 which extend between the corresponding corners of the front and rear head assemblies 17 and 18 outside, and parallel with, the barrel assembly 16. To secure the cylinder to a supporting surface, an L-shaped bracket 21 is bolted to the lower portion of each head assembly 17 and 18, it being understood that other mounting means may be employed if desired.

Referring now to Figure 2 the internal structure of barrel assembly 16 is shown, such assembly comprising an inner barrel 22 and an outer barrel 23 of substantially greater diameter, the two barrels being disposed in coaxial relationship. The forward and rearward edges of both barrels 22 and 23 are entered in matching annular grooves 24 on the adjacent faces of the head members 17 and 18, an annular resilient seal 26 being disposed in each such groove so that the two barrels are made fluid tight except for such passages as will hereinafter be described.

A cylindrical piston 27 is slidably disposed within inner barrel 22, the piston being rabbeted around the forward and rearward periphery to receive annular seals 28 and having a coaxial groove 29 around the central section to receive a third seal 31. Seals 28 are held in position by a pair of circular plates 32 one of which is disposed coaxially against the forward face of the piston and the other being similarly disposed against the rearward face thereof.

A drive rod 33 is disposed along the axis of the cylinder and extends through a bore 34 through the center of front head assembly 17, the rod having a rearward extremity 37 of reduced diameter which extremity extends through a center passage 38 through the piston 27 and adjacent plates 32. Extremity 37 is threaded to receive a nut 39 which secures the rod 33 to the piston 27 and which secures plates 32 thereagainst. To make the passage 38 fluid tight, an annular seal 41 is disposed in a groove in the piston 27 around the forward end of the passage.

A bushing 42 is disposed coaxially within bore 34 in the front head 17 to provide a bearing surface for the drive rod 33. An annular seal 43 is disposed in an enlarged section of the bore 34, forwardly from bushing 42, and is held in place by an annular back-up ring 44 which is mounted in a more enlarged section of the bore. Both seal 43 and ring 44 are locked in position by an annular washer 46 mounted in an annular groove forwardly from the ring. An annular drive rod scraper 47 is press-fitted into an annular recess at the extreme forward end of the bore 34.

A second piston 48 of cylindrical configuration is slidably disposed within the outer barrel 23 which piston encircles the inner barrel 22 and which is coaxial therewith. A pair of spaced apart annular seals 49 are mounted in grooves around the outer surface of the piston 48 and a second pair of seals 51 are mounted in spaced grooves around the inner surface of the piston, the seals 51 being more widely spaced apart than seals 49.

As will hereinafter be discussed in more detail, a quantity of hydraulic fluid, such as oil, is disposed within the barrels 22 and 23 rearwardly of the pistons 27 and 28 therein. To provide for the exhaust of fluid which may leak past the more rearward of the seals 49, or seals 51, and become entrapped therebetween, a check valve action is built into the piston 48. Such action is accomplished by forming an annular shelf 52 of reduced diameter at the forward end of the piston 48 and forming an annular groove 53 of V-shaped cross-section around the shelf. A number of small passages 54 communicate between the bottom of groove 53 and the inner surface of the piston 48 and additional passages 56 are provided to communicate between the inner surface of the piston and the outer surface thereof at points located between the seals 49. A resilient O-ring 57 is mounted in groove 53 which ring acts as the check valve element and allows hydraulic fluid which is trapped between the seals 49 or the seals 51 to escape to the forward end of outer barrel 23 while preventing fluid movement in the opposite direction. A pumping action on the check valve is exerted by the admission and release of compressed air at the forward end of barrel 23 as will hereinafter be described.

A check valve action similar to that described above is performed on the first piston 27 by making the seals 28 of the type having a flexible lip positioned to lie against the inner surface of barrel 22. This type of seal is preferably not used on the second piston 48 inasmuch as the O-rings 49 and 51 thereon will adjust better to any slight eccentricity between the two barrels 22 and 23.

As will be hereinafter discussed in more detail, means are provided within the rear head assembly 18 for permitting the hydraulic fluid 58 to flow between the rearward ends of the two barrels 22 and 23 at a controlled rate. Thus if compressed air is admitted to the forward end of outer barrel 23, piston 48 forces fluid into the rearward end of barrel 22 moving the piston 27 and causing the drive rod 33 to extend from the cylinder. Similarly if the compressed air is admitted to the forward end of the inner barrel 22 the drive rod is retracted into the cylinder and fluid is returned to the outer barrel 23 returning the second piston 48 to a forward position. Thus ideally the volume of the space between the outer barrel 23 and the inner barrel 22 should equal the volume of the latter with due adjustment being made for the volumes of the pistons therein.

In practice, however, a manufacturer may find it more economical to form the cylinder of stock parts and to correct for any inequality in the barrel volumes. In this circumstance, a stop may be employed to limit the motion of one of the pistons to less than the full length of the corresponding barrel. Thus in the present embodiment a sleeve 59 is disposed around the drive rod 33 to limit the motion of the first piston 27 within the inner barrel 22. Such sleeve is positioned immediately to the front of piston 27 and is held in position by an inwardly turned rearward rim 61 which is clamped between the rearward end of the principal section of the drive rod 33 and the adjacent plate 32.

Considering now means for actuating the cylinder by selectively admitting compressed air to one of the barrels 22 and 23 while simultaneously venting the other, a valving means is shown in Figure 3, such valve being mounted in the front head assembly 17 and being of the general type disclosed in the aforementioned co-pending application Ser. No. 841,133.

A transverse bore 62 is provided within the front head 17 in the upper portion thereof, each end of the bore being closed by a circular bleeder valve housing 63 one of which housings is secured to each side of the head. Each of the housings 63 is provided with internal passages 64 which connect the adjacent end of bore 62 with a threaded opening 66 at the top of the housing. To provide a means for manually venting a selected end of the bore 62, to actuate the cylinder as will hereinafter be described, one of a pair of button bleeder valves 67 is secured in each of the openings 66.

The bleeder valves 67 each comprise a tapered tubular body 68 threadably engaged in the opening 66 and having a downwardly flaring annular valve seat 69 at the lower end. A valve spindle 71 is slidingly disposed in the body 68 and a tapered valve element 72, mounting a circular seal 73, is formed at the lower end of the spindle to engage in the valve seat 69. The top end of spindle 71 projects upward from body 68 and a button 74, suitable to be depressed by the thumb of an operator, is mounted thereon. A compression spring 76 is disposed within body 68 and bears against a shelf on spindle 71 to urge the valve to the closed position.

A cylindrical sleeve 77 is disposed coaxially within bore 62, the sleeve having a length and diameter similar to that of the bore. Five equally spaced circumferential grooves are formed in the outer surface of sleeve 77 thus forming, in conjunction with the adjacent wall of bore 62, a series of five annular chambers 78, 79, 81, 82 and 83. Each of the foregoing chambers 78 to 83 is communicated with the interior of sleeve 77 by a number of apertures 84 distributed around each of the grooves and the chambers are made air-tight by O-rings 86 one of which encircles the sleeve 77 between each neighboring pair of the chambers and between each terminal one of the chambers and the adjacent end of the sleeve.

Figure 5:
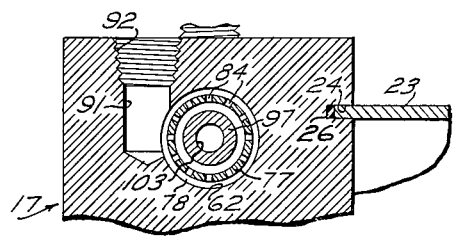
Figure 5 is a section view taken along line 5—5 of Figure 3.
Figure 6:
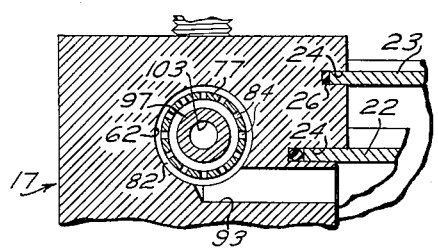
Figure 6 is a section view taken along line 6—6 of Figure 3.
Figure 7:
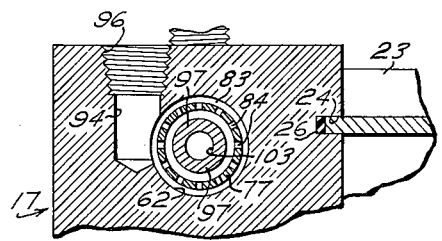
Figure 7 is a section view taken along line 7—7 of Figure 3.

Referring now to Figure 2 in conjunction with Figure 3, a vertical passage 87 is provided in the upper portion of front head 17 which passage communicates with the central one 81 of the aforementioned chambers and which has a threaded opening 88 to provide for connection with a source of high pressure air. As shown in Figure 4, a passage 89 connects chamber 79 with the forward end of the outer barrel 23 and, as shown in Figure 5, a passage 91 connects chamber 78 with a threaded opening 92 at the top of the front head. As shown in Figure 6, a passage 93 communicates chamber 82 with the forward end of inner barrel 22 and, with reference to Figure 7, a passage 94 connects chamber 83 with a second threaded opening 96 at the top of the front head. Thus by making appropriate interconnections between the chambers 78 to 83, compressed air may be supplied to a chosen one of the barrels 22 and 23 while simultaneously venting the other barrel.

Considering now the means for making such interconnections, and again with reference to Figure 3, a cylindrical spool 97 is disposed coaxially within sleeve 77, the spool being of slightly less length than the sleeve and being slidable therein. The spool 97 is of less diameter than the internal diameter of sleeve 77 except at four points at which enlarged sections are formed, each such section 98 having an annular groove 99 in which an O-ring 101 is mounted.

The enlarged sections 98 are spaced apart so that when the spool 97 is moved in a first direction within the sleeve, the compressed air inlet chamber 81 is communicated with chamber 79, through the apertures 84, and thus air is admitted to the outer barrel 23. Simultaneously with the foregoing, the spacing of the enlarged sections 98 of the spool acts to connect chambers 82 and 83 thus venting the inner barrel 22 and causing the cylinder to extend. When the spool 97 is moved to the extreme position in the opposite direction, the foregoing interconnections are reversed so that chamber 82 is communicated with chamber 81 and chamber 78 is communicated with chamber 79. Thus compressed air is admitted to the inner barrel 22 and the outer barrel 23 is vented thereby causing the cylinder to retract.

To effect movement of the spool 97 between the two positions for controlling the cylinder, a pair of minute apertures 102 are provided in the spool between the two center ones of the enlarged sections 98. Each of the apertures 102 communicates with a separate end of the spool 97 through a passage 103 therein. The apertures 102 serve to supply compressed air to the end regions within sleeve 77, such air normally exerting an equal force on each end of the spool 97. If, however, an operator depresses one of the bleeder valves 67, the pressure drops at the corresponding end of sleeve 77 and the spool 97 moves to such end. As compressed air leaks through aperture 102 to this end of the sleeve, the pressure again builds up to equal that at the opposite end of the sleeve. The spool 97, however, remains stationary until the opposite bleeder valve 67 is depressed.

The bleeder valves 67 are thus the means by which an operator causes the cylinder to extend or retract. It should be understood that such valves need not be the manually operated type shown in this embodiment. Solenoid controlled bleeder valves may be employed or the valves may be of a type operated by fluid pressure variations transmitted through a conduit from a remote control source.

Figure 8:
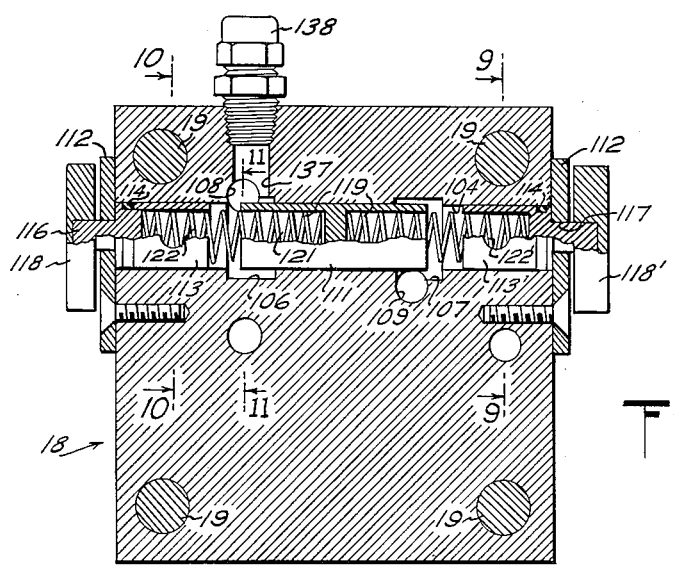
Figure 8 is a cross-section view taken along line 8—8 of Figure 2 and showing details of the rear head of the cylinder.

Referring now to Figure 8, means are shown for limiting the stroke velocity of the cylinder to a selected speed, such means being situated in a transverse bore 104 in the rear head member 18 and being an adjustable constant flow valve for regulating the exchange of hydraulic fluid between the rearward ends of the two barrels 22 and 23.

To separately connect the regulating valve with both of the barrels 22 and 23, two spaced apart enlarged sections 106 and 107 are formed in bore 104, such sections being equally distant from the center of the bore and being spaced a substantial distance inward from the ends of the bore. A passage 108 extends forwardly from enlarged section 106 and communicates with the rearward end of the outer barrel and a second passage 109 extends forwardly from enlarged section 107 to connect with the rearward end of the inner barrel.

A cylindrical piston 111 is disposed coaxially within bore 104, the piston being slidable therein and having a length slightly in excess of the spacing between the enlarged bore sections 106 and 107 so that when the piston is centered in the bore the two ends of the piston project partly into each such section.

Each end of bore 104 is closed by a rectangular plate 112 which plates are secured against the lateral walls of the rear head member 18. Hollow cylinders 113 and 113' are disposed coaxially within opposite ends of the bore 104, each cylinder being rotatable and having an O-ring 114 mounted in an encircling groove. The outer end of each cylinder 113 and 113' is closed and an axial projection 116 thereon extends through an opening 117 in the adjacent plate 112. A circular knob 118 and 118' is secured to the end of each projection 116 so that the associated cylinders 113 and 113' may be rotated by an operator for the purpose of adjusting the stroke velocity of the cylinder as will hereinafter be described.

A pair of compression springs 119 are disposed within bore 104, one on each side of piston 111. Each such spring has one end entered in a cylinder 113 and 113' and the opposite end entered in a well 121 in the adjacent end of piston 111 so that the two springs exert a force tending to center the piston in the bore 104.

Figure 9:
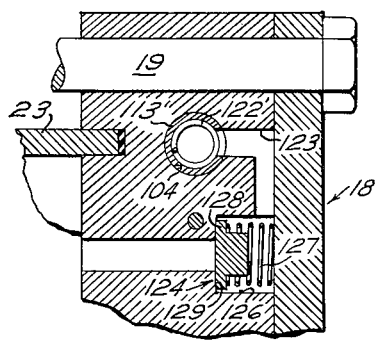
Figure 9 is a section view taken along line 9—9 of Figure 8.

Each of the rotatable cylinders 113 and 113' functions as a variable orifice valve and accordingly an opening 122 and 122' is provided in the lateral wall of each cylinder, such openings being inward from the O-rings 114 thereon. As will be seen by reference to Figure 9 in conjunction with Figure 8, a passage 123 is formed within rear head member 18 which passage intersects bore 104 at the position of opening 122' on cylinder 113'. Thus rotation of cylinder 113', by means of knob 118', will act to vary fluid flow through passage 123 which passage opens into the rearward end of outer barrel 23 through a check valve 124. Check valve 124 is disposed within an enlarged section 126 of the passage 123 and includes a compression spring 127 bearing against a valve member 128 which seats against a shoulder 129 in the enlarged section, the valve acting to restrict fluid flow to a direction towards bore 104.

Figure 10:
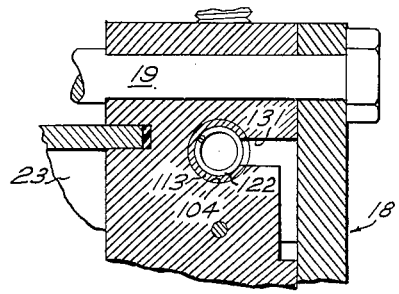
Figure 10 is a section view taken along line 10—10 of Figure 8.
Figure 11:
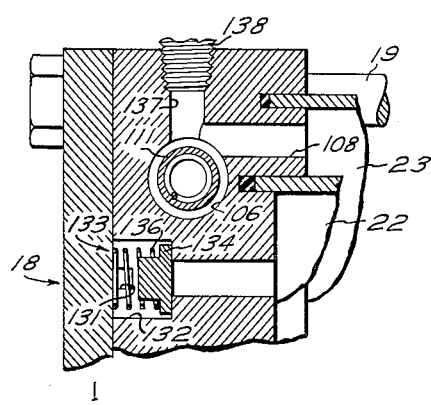
Figure 11 is a section view taken along line 11—11 of Figure 8.

As shown in Figures 10 and 11, a passage 131 intersects bore 104 at the position of opening 122 on cylinder 113 and extends first rearwardly therefrom, then downwardly, and then horizontally towards the central region of the rear head member 18. The passage 131 then extends forwardly through an enlarged section 132 and subsequently to the rearward end of the inner barrel 22. A check valve 133, similar to that described above, is disposed in the enlarged section 132 such valve including a valve member 134 and a compression spring 136 bearing thereon to limit fluid flow to a direction leading to bore 104.

Considering now how the above described structure serves to hold the exchange of fluid between the inner and outer barrels to a selected constant rate, it will be seen that the longitudinal position of piston 111 in bore 104 will vary in accordance with any fluid pressure differential between sections 106 and 107 of the bore. During the extension stroke of the cylinder, fluid will flow through section 107 but will not flow through section 106 owing to the action of the check valves 124 and 133. Owing to the lessened pressure in section 106 brought about by such flow, the piston 111 will be drawn somewhat out of a center position in bore 104 and will extend further into section 107 until an equilibrium position is reached. The rate of flow through the system, and thus the equilibrium position of the piston 111, is determined by the setting of the variable orifice formed by opening 122' and thus may be chosen by an operator by appropriate rotation of knob 118'.

If the flow rate through section 106 should tend to increase a correspondingly greater pressure differential is sensed by the piston 111 and the piston moves further into section 107 thereby restricting the flow and preserving the selected flow rate. Conversely, a tendency for the flow to decrease causes the piston 111 to move away slightly from section 106 thereby maintaining the original flow. On the retraction stroke of the cylinder an action similar to that described above occurs at section 106, the piston 111 moving into or away from the section in response to a tendency for the flow to increase or decrease. Thus the cylinder stroke velocity may be regulated for both the extension and retraction strokes and the velocities of the two strokes may be set to different values inasmuch as the extension control knob 118' and associated mechanism is independent of the retraction control knob 118 and associated mechanism.

To provide for the filling of the cylinder with hydraulic fluid, a passage 137 extends upwardly from section 106 of bore 104 within the rear head, the upper end of the passage being threaded and closed by a threaded plug 138. Similarly, and with reference again to Figure 3, bleeder passages are provided in the front head 17 for draining leakage fluid, one such passage 139 communicating with the outer barrel 23 and being closed by a plug 141 and a second passage 142 communicating with the inner barrel 22 and being closed by a plug 143.

It should be understood that the drive cylinder herein described is but one embodiment of the inventive concept and that many modifications and variations are possible. The compressed air control valve, for example, has been herein shown contained within the forward head member of the cylinder and the stroke velocity regulating mechanisms have been shown contained within the rear head member, the arrangement being a highly compact and efficient one. It will be apparent, however, that the locations of the control valve and the regulating mechanism may be reversed and that one or both of such mechanisms may be situated remotely from the remainder of the cylinder if desired.

Similarly, various auxiliary mechanisms may be built into the cylinder. A skip mechanism, for example, may be provided as disclosed in the aforementioned co-pending application Ser. No. 842,789, such mechanism being essentially an additional passage connecting the rearward ends of the two barrels which passage is normally closed by a valve and which may be opened temporarily by actuation of the valve to bypass the flow regulating mechanism and permit the cylinder to operate at maximum velocity for a selected period.

What is claimed is:

1. In a pneumatic drive mechanism, the combination comprising an outer cylinder having an air inlet at a first end, an inner cylinder of lesser diameter than said outer cylinder, said inner cylinder being disposed coaxially within said outer cylinder and having an air inlet at a first end, an annular first piston disposed within said outer cylinder, a cylindrical second piston disposed within said inner cylinder, means providing a fluid passage between the second ends of said inner and outer cylinders, a quantity of hydraulic fluid disposed within said inner and outer cylinders at said second ends thereof, and means connecting with at least one of said pistons for transmitting motion thereof to a load.

2. In a pneumatic drive mechanism, the combination comprising a first cylinder having an air inlet opening at a forward end, a second cylinder having an air inlet opening at a forward end, said second cylinder being of substantially less diameter than said first cylinder and being disposed coaxially therein, an annular first piston slidably disposed between said first and second cylinders in coaxial relationship thereto, a cylindrical second piston slidably disposed within said second cylinder, a piston rod disposed longitudinally with respect to said cylinders and connecting with one of said pistons for transmitting movement thereof to an external load, a flow control valve providing an adjustable fluid passage between the rearward ends of said first and second cylinders, and a quantity of hydraulic fluid filling the rearward ends of said first and second cylinders behind said pistons.

3. In a pneumatic drive mechanism substantially as described in claim 2, the further combination of a first check valve disposed in said fluid passage and restricting flow therethrough to a direction away from said first cylinder, a second flow control valve providing a second fluid passage between the rearward ends of said first and second cylinders, and a second check valve restricting flow through said second fluid passage to a direction towards said first cylinder.

4. A pneumatic drive mechanism substantially as described in claim 2 wherein said flow control valve is a valve of the class passing a slectable constant flow irrespective of variations in the fluid pressure.

5. In an air-driven cylinder, the combination comprising an inner and an outer cylindrical barrel, said inner barrel being of lesser diameter than said outer barrel and being disposed coaxially therein, a cylindrical piston slidably disposed within said inner barrel, an annular piston slidably dipsosed within said outer barrel and encircling said inner barrel, a control valve having provision for admitting compressed air to a first end of a selected one of said barrels and having provision for simultaneously venting the other of said barrels, means for transmitting motion of one of said pistons to an external load, a quantity of hydraulic fluid disposed in each of said barrels between said pistons therein and the second ends thereof, a valve cylinder having spaced apart openings each communicating with said second end of one of said barrels and having an intermediate opening communicating with the other of said barrels, a valve piston slidably disposed within said cylinder between said intermediate opening and one of said spaced apart openings, resilient means bearing on said valve piston and exerting a force thereon tending to position a portion of said valve piston in partially occluding relationship to said intermediate opening, means providing a variable orifice governing flow through said intermediate opening, a first check valve limiting flow through said intermediate opening to a direction towards a first of said barrels, means providing an additional passage between said second ends of said inner and outer barrels, and a second check valve operable upon said additional passage and limiting flow therethrough to a direction towards the second of said barrels.

6. In a pneumatic drive cylinder, the combination comprising a first cylindrical barrel having an air inlet passage at a first end, a second cylindrical barrel having an air inlet passage at a first end, said second barrel being of lesser diameter than said first barrel and being disposed therein in coaxial relationship therewith, an annular piston disposed between said first and second barrels in coaxial relationship therewith, a cylindrical piston disposed within said second barrel in coaxial relationship therewith, a drive rod connecting with one of said pistons for transmitting motion thereof to an external load, a control valve for admitting compressed air to said inlet of a selected one of said barrels while simultaneously venting the other of said barrels, a quantity of hydraulic fluid filling the second ends of said first and second barrels, means providing a pair of fluid passages between said second ends of said first and second barrels, a pair of check valves one disposed in each of said passages and limiting flow through said passages to opposed directions, and a pair of adjustable constant flow valves one acting on each of said passages whereby the exchange of fluid between said second ends of said first and second barrels may be separately regulated in each direction.

7. A pneumatic drive cylinder comprising, in combination, a cylindrical outer barrel, a cylindrical inner barrel of lesser diameter disposed coaxially within said outer barrel, a first head member secured against a first end of said outer and inner barrels and containing provision for selectively admitting compressed air to said first end of one of said barrels while simultaneously venting said first end of the other of said barrels, a second head member disposed against the second end of said outer and inner barrels, said second head member having a bore formed therein and having a pair of passages each communicating said second end of said outer barrel with said second end of said inner barrel, each of said passages intersecting said bore at spaced apart sections thereof, a slidable piston disposed within said bore between said spaced apart sections thereof, a resilient means bearing on said piston and exerting a force tending to center said piston between said sections of said bore, a first check valve disposed in a first of said passages and limiting flow therethrough to a direction towards said inner barrel, a first variable orifice valve disposed in said first passage and having a manual adjustment means external to said second head member, a second check valve disposed in the second of said passages and limiting flow therethrough to a direction towards said outer barrel, a second variable orifice valve disposed in said second passage and having a manual adjustment means external to said second head member, a cylindrical piston slidably disposed within said inner barrel, an annular piston slidably disposed in said outer barrel and encircling said inner barrel, a drive rod disposed longitudinally with respect to one of said barrels and connecting with said piston therein for transmitting motion thereof to an external load, and a quantity of hydraulic fluid filling the volumes of said outer and inner barrels between said pistons therein and said second head member.

8. In a valve for maintaining the exchange of fluid between a first and a second cylinder at a constant flow rate, the combination comprising a valve housing having a bore formed therein and having a pair of fluid passages therein each of which passages communicate between said first and second cylinders, each of said passages intersecting said bore of said cylinder at spaced apart regions thereof, a slidable piston disposed in said bore between said spaced apart regions thereof, a resilient means bearing on said piston and exerting a force thereon tending to center said piston between said regions of said bore, a first check valve disposed in a first of said fluid passages and limiting flow therethrough to a direction towards said first cylinder, and a second check valve disposed in the second of said fluid passages and limiting flow therethrough to a direction towards said second cylinder.

9. In a valve as described in claim 8, the further combination of a pair of selectively variable orifice valves each operable on a separate one of said fluid passages in said housing whereby the rate of exchange of fluid between said first and second cylinders many be independently adjusted for each direction of fluid exchange.

References Cited in the file of this patent
UNITED STATES PATENTS

| | | |
|---|---|---|
| 2,808,811 | McLaughlin | Oct. 8, 1957 |
| 2,860,604 | Morf | Nov. 18, 1958 |